United States Patent
Sayyed et al.

(10) Patent No.: US 12,204,914 B2
(45) Date of Patent: Jan. 21, 2025

(54) ENHANCED SERVICE OPERATING SYSTEM CAPABILITIES THROUGH EMBEDDED CONTROLLER SYSTEM HEALTH STATE TRACKING

(71) Applicant: Dell Products L.P., Round Rock, TX (US)

(72) Inventors: Ibrahim Sayyed, Georgetown, TX (US); Adolfo Montero, Pflugerville, TX (US); Chris Griffin, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 330 days.

(21) Appl. No.: 17/858,270

(22) Filed: Jul. 6, 2022

(65) Prior Publication Data

US 2024/0012651 A1 Jan. 11, 2024

(51) Int. Cl.
*G06F 9/4401* (2018.01)
(52) U.S. Cl.
CPC .................. *G06F 9/4406* (2013.01)
(58) Field of Classification Search
None
See application file for complete search history.

(56) References Cited

U.S. PATENT DOCUMENTS

| | | | |
|---|---|---|---|
| 7,010,724 B1* | 3/2006 | Hicok | G06F 11/076 714/39 |
| 10,146,653 B2 | 12/2018 | Brown et al. | |
| 11,157,349 B2 | 10/2021 | Shah et al. | |
| 2002/0133695 A1* | 9/2002 | Khatri | G06F 9/4411 713/1 |
| 2020/0202003 A1* | 6/2020 | Chaiken | G11C 29/52 |
| 2022/0382636 A1* | 12/2022 | Baldwin | G06F 21/575 |

* cited by examiner

*Primary Examiner* — Fahmida Rahman
(74) *Attorney, Agent, or Firm* — Larson Newman, LLP

(57) ABSTRACT

An information handling system includes a memory that stores context data associated with a crash of the information handling system. A BIOS determines whether a crash of the information handling system occurred during a most recent operating system runtime of the information handling system. In response to the determination of the crash during the most recent operating system runtime, the embedded controller reads the context data associated with the crash of the information handling system. An embedded controller verifies a golden BIOS image for the information handling system, and sets an indication for an operating system of the information handling system to revert to original setting for a healthy boot.

16 Claims, 4 Drawing Sheets

ENHANCED SERVICE OPERATING SYSTEM CAPABILITIES THROUGH EMBEDDED CONTROLLER SYSTEM HEALTH STATE TRACKING

FIELD OF THE DISCLOSURE

The present disclosure generally relates to information handling systems, and more particularly relates to enhanced service operating system capabilities through embedded controller system health state tracking.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs, and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a memory that may store context data associated with a crash of the information handling system. A BIOS may determine whether a crash of the information handling system occurred during a most recent operating system runtime of the information handling system. In response to the determination of the crash during the most recent operating system runtime, an embedded controller may read the context data associated with the crash of the information handling system. The embedded controller may verify a golden BIOS image for the information handling system, and set an indication for an operating system of the information handling system to revert to original setting for a healthy boot.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
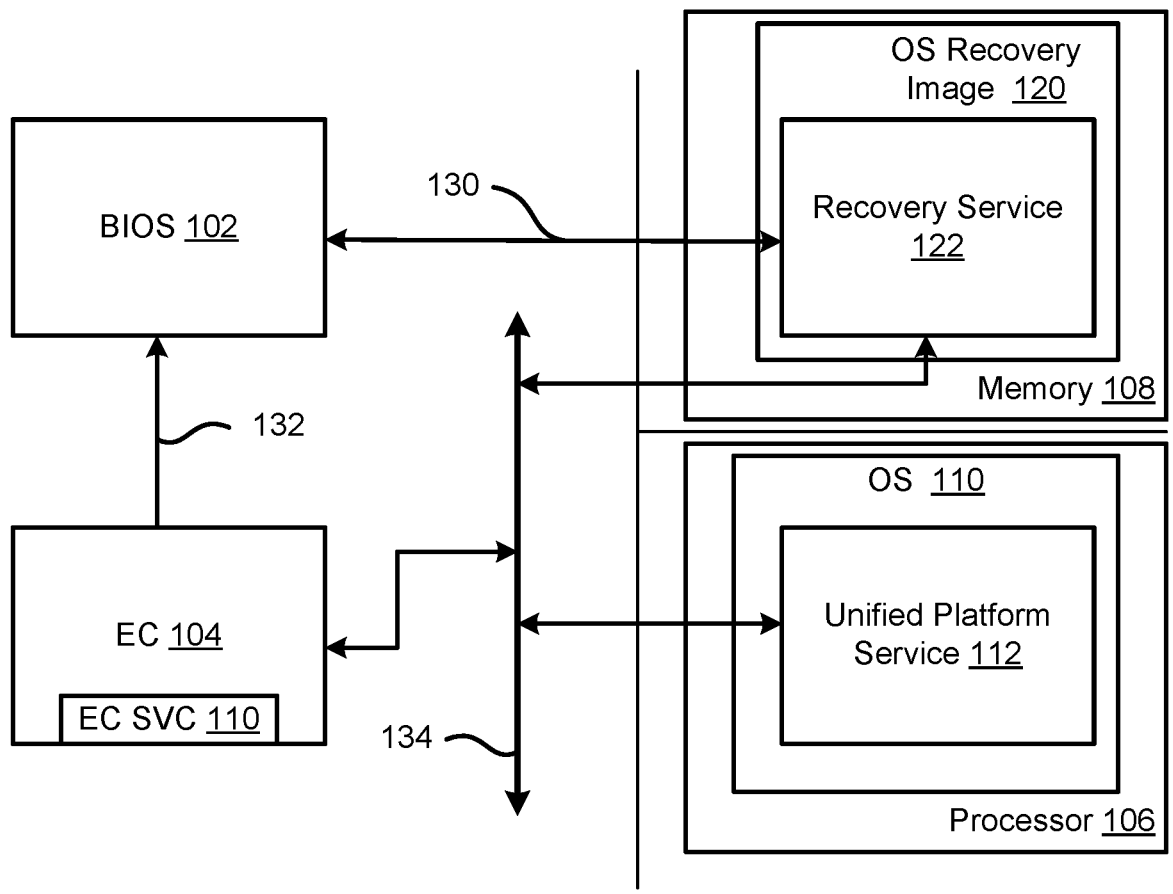
FIG. 1 is a diagram of a portion of an information handling system according to at least one embodiment of the present disclosure.

FIG. 1 illustrates a portion of an information handling system 100 according to an embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling system 100 includes a basic input/output system (BIOS) 102, embedded controller 104, a processor 106, and a memory 108. Processor 106 includes an operating system (OS) 110, which in turn includes a unified platform service 108. Memory 108 may store an OS recovery image 120, which in turn includes a recovery service 122. In an example, BIOS 102 may communicate with recovery service 122 via a communication channel 130. In certain examples, communication channel 130 may provide any suitable communication protocol including, but not limited to, advance configuration and power interface (ACPI) and windows management instrumentation (WMI).

Embedded controller 104 may communicate with BIOS 102 via a communication channel 132, such as an embedded controller MBOX channel.

Embedded controller 104 may communicate with unified platform service 112 and recovery service 122 via a communication bus 134, such as an embedded controller memory-mapped input/output (MMIO) bus. In an example, embedded controller 104 may be a physical chip that is separate from processor 106, and the embedded controller may include its own firmware stored within a flash memory of the embedded controller.

During operation of the information handling system 100, a system crash of the information handling system may occur. After the system crash, information handling system 100 may perform one or more operations to provide a system recovery. In previous information handling systems, a processor may invoke a service-OS recovery solution to diagnose and fix the source of the system crash. These previous information handling system may include a significant limitation to the capabilities of the service-OS approach because previous information handling systems were tailored to handle OS-level image/driver issues. Previous information handling systems did not include links to the bare-metal system information, such as unique hardware control handles at both an embedded controller and a service BIOS level. For example, if an individual associated with an information handling system changes a setup option to enable overclocking and a system crash occurs, the service-OS of a previous information handling system would not know to turn off overclocking as a remediation approach to ensure a successful boot.

In another situation, the individual may insert a memory DIMM that may stall memory reference code (MRC) such that the BIOS may be unable to boot the machine. In this situation, previous information handling systems would not be able to run the service-OS. Based on a previous information handling not being able to run the service-OS, this previous information handling system would not be able to boot the BIOS. Without the BIOS being able to boot, previous information handling system would not be able to load a BKC or golden-image back onto the system. Additionally, in previous information handling system, when a new BIOS image causes an issue for a particular hardware configuration, the information handling system would not be able to run or execute the Service-OS to restore the system back to the golden image. Information handling system 100 may be improved by embedded controller 103 performing one or more operations to recover the information handling system from OS crashes in a software stack above the bare-metal state.

For example, embedded controller 104 may enable information handling system 100 to recover from OS layer and hardware problems by reverting to golden configuration by runtime operations performed by the embedded controller as will be described herein. In an example, embedded controller 104 may be referred to as the last line of defense regarding operation of information handling system 100 at the bare-metal level. In this situation, even when service BIOS (SBIOS) cannot run, embedded controller 104 may still operate close to the hardware level because the embedded controller may control all power rails and has access to the SPI Flash for the Root of Trust functionality. However if embedded controller 104 fails to boot, such as when both primary and secondary images failed, information handling system 100 is effectively bricked.

In an example, embedded controller 104 may be linked to the SBIOS of information handling system 100 in any suitable manner. For example, the link may be formed during a golden image snapshot. In certain examples, the link between the embedded controller 104 and the SBIOS may enable the embedded controller alone to restore information handling system 100 to the golden image whenever all other protection layers fail for the information handling system. In an example, the golden image snapshot may include a restoration of the golden image for BIOS 102 as well as the BIOS settings.

During operation of information handling system 100, embedded controller 104 may monitor any hardware configuration changes as compared to the hardware configuration in the golden image. In this situation, the detected hardware configuration changes, such as memory DIMM changes, may be captured and flagged so that the MRC may ignore any DIMMs or other hardware not in the golden image capture configuration. During a restoration boot stage after a system crash, embedded controller 104 may utilize its Root of Trust Flash to access capabilities and may restore the golden BIOS image as well as the golden BIOS settings. During the restoration boot, embedded controller 104 may include a flag to cause the SBIOS to pull the golden image hardware configuration and to ignore/disable any new hardware components that could be causing instability in the boot operations of information handling system 100.

In an example, an individual associated with information handling system 100 may change a configuration or setting within the information handling system to provide processor 106 over clock application. In an example, the over clocking of processor 106 may introduce performance issue with OS 110, which in turn may result in a system crash of information handling system 100. In response to the system crash, unified platform service 112 of OS 110 may provide embedded controller with context data associated with the system crash. Embedded controller 104 may then store the context data in a persistent memory space associated with the embedded controller.

During a next reboot, BIOS 102 may identify or learn about a blue screen of death (BSOD) issue of information handling system 100. In certain examples, BIOS 102 may identify the BSOD issue at any particular state of information handling system 100, such as during boot time, during OS 110 runtime via Bug check code, or the like. In response to the detected BSOD, BIOS 102 may notify embedded controller 104 and attempt a boot of OS recovery image 120. Based on the boot of OS recovery image 120, processor 106 may execute recovery service 122 to attempt to fix or repair the OS 110 crash. However, processor 106 may not be able to repair OS 100 via an OS repair tool set within recovery service 122.

In response to the issue with OS 110 not being fixed by processor 106 execution OS repair tool set within of recovery service 122, the processor may provide the previous OS context for information handling system 100 to embedded controller 104 via communication bus 134. In an example, the previous OS context may be recently stored as BKC in the persistent memory associated with the embedded controller. Based on the previous OS context, embedded controller service 110 within embedded controller 104 may send the BSOD context data and configuration or setting changes as compared with the golden image of information handling system 100. In an example, the configuration or setting changes may include, but are not limited to, the user CPU over clock setting and any other bare-metal specific changes that have occurred.

Based on the type of error information identified in the configuration or setting changes, recovery service 122 may perform recommended actions. In certain examples, the recommended actions may include, but are not limited to, resetting the CPU over clock configuration to the original clock speed. Recovery service 122 may provide embedded controller service 110 with notification that the recommended actions have been completed. In response to the recommended actions being completed, embedded controller service 110 may read the failure context from the service-OS and BIOS 102. Based on the failure context, embedded controller service 110 may apply the settings and/or signal the settings to a respective layer of the information handling system 100. For example, upon a next reboot, unified platform service 112 may read the context from embedded controller 104 and apply the settings. While the operations performed by the components of information handling system 100 have been described with respect to a crash in the OS kernel based on an CPU over clock setting, one of ordinary skill in the art would recognize that similar operations may be performed for any type of system crash within the information handling system without varying from the scope of this disclosure.

Figure 2:
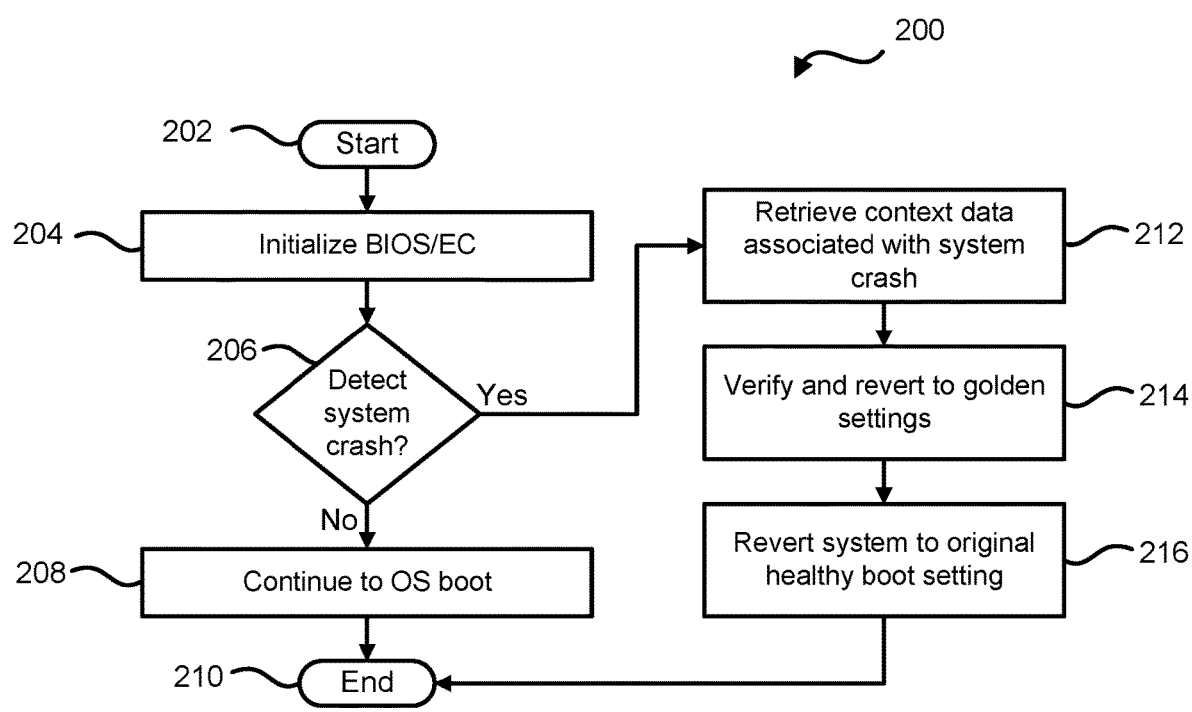
FIG. 2 is a flow diagram of a method for performing enhanced service operating system capabilities through embedded controller system health state tracking according to at least one embodiment of the present disclosure.

FIG. 2 shows a flow diagram of a method 200 for performing enhanced service operating system capabilities through embedded controller system health state tracking according to at least one embodiment of the present disclosure according to at least one embodiment of the present disclosure, starting at block 202. In an example, the method 200 may be performed by any suitable component including, but not limited to, a processor, such as embedded controller 104 of FIG. 1. It will be readily appreciated that not every method step set forth in this flow diagram is always necessary, and that certain steps of the methods may be combined, performed simultaneously, in a different order, or perhaps omitted, without varying from the scope of the disclosure.

At block 204, a BIOS and embedded controller of an information handling system are initialized. At block 206, a determination is made whether a system crash has occurred. In an example, an embedded controller service may perform the determination of whether a system crash has occurred. In certain examples, the system crash may be a BSOD, a BIOS level crash, an OS runtime level crash, or the like. If a system crash has not occurred, the boot operations continue to an OS boot at block 208 and the flow ends at block 210.

If a system crash has occurred, context data associated with the system crash is retrieved at block 212. In certain examples, the context data may be retrieved by the embedded controller service reading the context data from pre-boot BIOS, from a runtime OS, or the like. In an example, prior to the embedded controller service reading the context data, a service-OS may perform any suitable number of operations to correct or recovery from the system crash. For example, the information handling system may boot to the service-OS, which in turn may perform action or operations to correct a software crash or the like. However, if the system crash was caused by a hardware configuration, the service-OS may not be able to correct the issue because during boot operations the MRC may not execute properly with the different hardware configuration. Based on the failure of the service-OS to recover the information handling system from the system crash, the service-OS may provide a communication to the embedded controller indicating that the issue may not be resolved. Based on the indication from the service-OS, the embedded controller service may perform the operations of block 212.

In an example, the retrieving of the context data may include determining hardware configuration changes, retrieving a pre-boot failure context from the BIOS, retrieving a runtime failure context from the service-OS, or the like. At block 214, the embedded controller service may verify and revert the firmware of information handling system to a golden firmware image. In an example, the embedded controller may utilize a root of trust (RoT) to access the golden image and determine setting and configuration changes within the information handling system from the golden image. For example, the embedded controller service may compare the current settings and hardware configurations to the settings and configurations of the golden image. Based on the determined changes, embedded controller service may provide an indication to the BIOS service to disable or ignore these settings and configurations during the next boot.

In response to the indication the disable or ignore settings and configuration changes, the BIOS may boot to the golden image or any other healthy boot image at block 216 and the flow ends at block 210. In an example, the disabling of settings or hardware configuration changes may enable the MRC to properly train and complete the boot of information handling system to the healthy or golden boot image, such that the information handling system may recover from the system crash.

Figure 3:
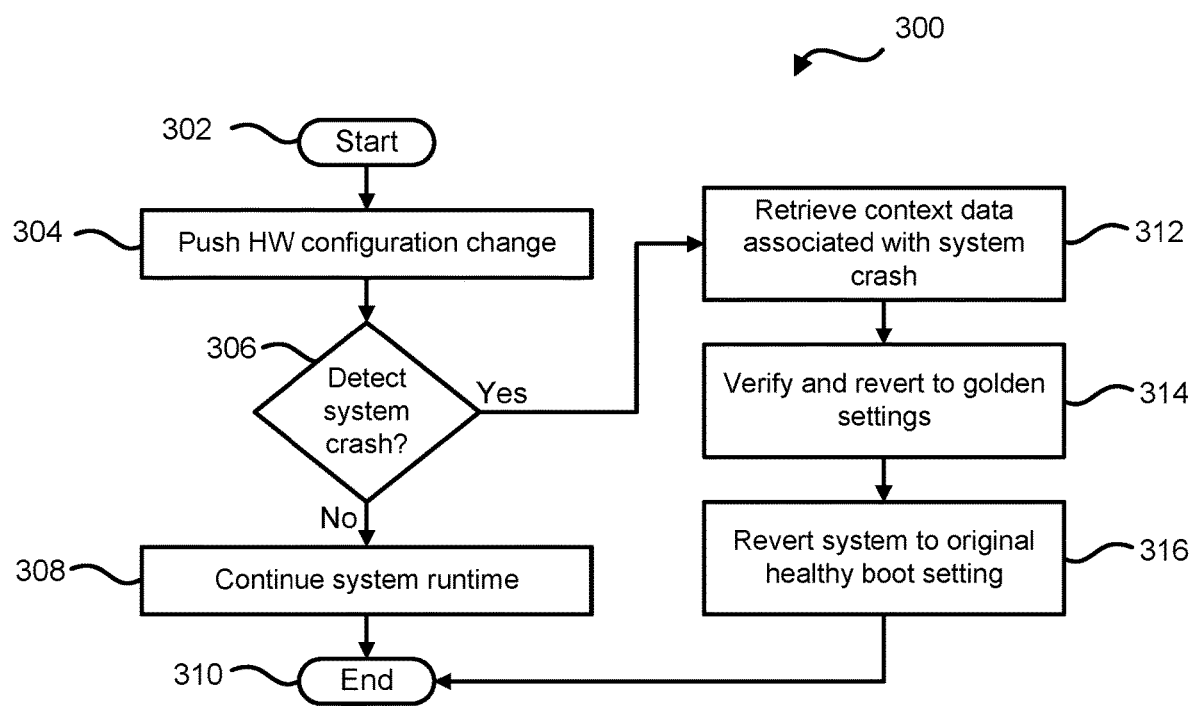
FIG. 3 is a flow diagram of another method for performing enhanced service operating system capabilities through embedded controller system health state tracking according to at least one embodiment of the present disclosure.

FIG. 3 shows a flow diagram of a method 300 for performing enhanced service operating system capabilities through embedded controller system health state tracking according to at least one embodiment of the present disclosure according to at least one embodiment of the present disclosure, starting at block 302. In an example, the method 300 may be performed by any suitable component including, but not limited to, a processor, such as embedded controller 104 of FIG. 1. It will be readily appreciated that not every method step set forth in this flow diagram is always necessary, and that certain steps of the methods may be combined, performed simultaneously, in a different order, or perhaps omitted, without varying from the scope of the disclosure.

At block 304, a hardware configuration changed is pushed to an information handling system. In an example, the hardware configuration change may be pushed while the information handling system is up and running. At block 306, a determination is made whether a system crash has occurred. In an example, an embedded controller service may perform the determination of whether a system crash has occurred. In certain examples, the system crash may be a BSOD, a BIOS level crash, an OS runtime level crash, or the like. The system crash may occur at any suitable time including, but not limited to, at time of execution, late point of time, and upon next reboot due to previous runtime operation. If a system crash has not occurred, runtime operations are continued in the information handling system at block 308 and the flow ends at block 310.

If a system crash has occurred, context data associated with the system crash is retrieved at block 312. In certain examples, the context data may be retrieved by the embedded controller service reading the context data from pre-boot BIOS, from a runtime OS, or the like. In an example, prior to the embedded controller service reading the context data, a service-OS may perform any suitable number of operations to correct or recovery from the system crash. For example, the information handling system may boot to the service-OS, which in turn may perform action or operations to correct a software crash or the like. However, if the system crash was caused by a hardware configuration, the service-OS may not be able to correct the issue because during boot operations the MRC may not execute properly with the different hardware configuration. Based on the failure of the service-OS to recover the information handling system from the system crash, the service-OS may provide a communication to the embedded controller indicating that the issue may not be resolved. Based on the indication from the service-OS, the embedded controller service may perform the operations of block 312.

In an example, the retrieving of the context data may include determining hardware configuration changes, retrieving a pre-boot failure context from the BIOS, retrieving a runtime failure context from the service-OS, or the like. At block 314, the embedded controller service may verify and revert the firmware of information handling system to a golden firmware image. In an example, the embedded controller may utilize a root of trust (RoT) to access the golden image and determine setting and configuration changes within the information handling system from the golden image. For example, the embedded controller service may compare the current settings and hardware configurations to the settings and configurations of the golden image. Based on the determined changes, embedded controller service may provide an indication to the BIOS service to disable or ignore these settings and configurations during the next boot.

In response to the indication the disable or ignore settings and configuration changes, the BIOS may boot to the golden image or any other healthy boot image at block 316 and the flow ends at block 310. In an example, the disabling of settings or hardware configuration changes may enable the MRC to properly train and complete the boot of information handling system to the healthy or golden boot image, such that the information handling system may recover from the system crash.

Figure 4:
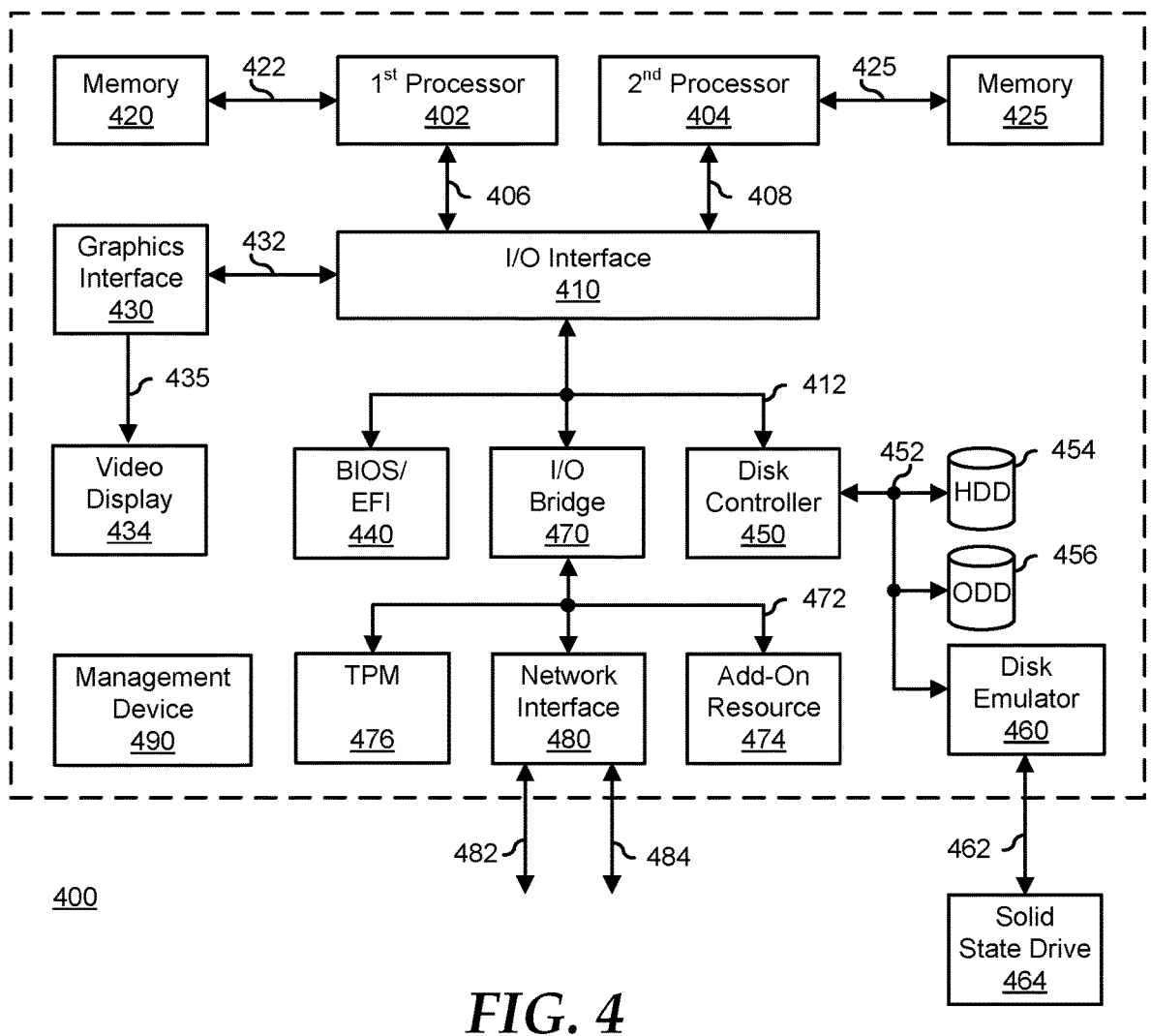
FIG. 4 is a block diagram of a general information handling system according to an embodiment of the present disclosure.

FIG. 4 shows a generalized embodiment of an information handling system 400 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below and operates to perform one or more of the methods described below. Information handling system 400 includes a processors 402 and 404, an input/output (I/O) interface 410, memories 420 and 425, a graphics interface 430, a basic input and output system/universal extensible firmware interface (BIOS/UEFI) module 440, a disk controller 450, a hard disk drive (HDD) 454, an optical disk drive (ODD) 456, a disk emulator 460 connected to an external solid state drive (SSD) 462, an I/O bridge 470, one or more add-on resources 474, a trusted platform module (TPM) 476, a network interface 480, a management device 490, and a power supply 495. Processors 402 and 404, I/O interface 410, memory 420, graphics interface 430, BIOS/UEFI module 440, disk controller 450, HDD 454, ODD 456, disk emulator 460, SSD 462, I/O bridge 470, add-on resources 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to I/O interface 410 via processor interface 406, and processor 404 is connected to the I/O interface via processor interface 408. Memory 420 is connected to processor 402 via a memory interface 422. Memory 425 is connected to processor 404 via a memory interface 427. Graphics interface 430 is connected to I/O interface 410 via a graphics interface 432 and provides a video display output 436 to a video display 434. In a particular embodiment, information handling system 400 includes separate memories that are dedicated to each of processors 402 and 404 via separate memory interfaces. An example of memories 420 and 430 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 440, disk controller 450, and I/O bridge 470 are connected to I/O interface 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 410 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources.

BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 4394 (Firewire) interface, a proprietary interface, or a combination thereof. Alternatively, solid-state drive 464 can be disposed within information handling system 400.

I/O bridge 470 includes a peripheral interface 472 that connects the I/O bridge to add-on resource 474, to TPM 476, and to network interface 480. Peripheral interface 472 can be the same type of interface as I/O channel 412 or can be a different type of interface. As such, I/O bridge 470 extends the capacity of I/O channel 412 when peripheral interface 472 and the I/O channel are of the same type, and the I/O bridge translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as I/O interface 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 400. In particular, management device 490 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400.

Management device 490 can operate off of a separate power plane from the components of the host environment so that the management device receives power to manage information handling system 400 when the information handling system is otherwise shut down. An example of management device 490 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 490 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system comprising:
   a memory configured to store context data associated with a crash of the information handling system;
   a basic input/output system (BIOS) configured to determine whether a crash of the information handling system occurred during a most recent operating system runtime of the information handling system; and
   an embedded controller configured to communicate with the memory, the embedded controller to:
   in response to the determining of the crash during the most recent operating system runtime, read the context data associated with the crash of the information handling system;
   verify a golden BIOS image for the information handling system;
   set an indication for an operating system of the information handling system to revert to original setting for a healthy boot; and
   read hardware configuration changes from the golden BIOS image,
   wherein the BIOS is further configured to: during a restoration boot, disable the hardware configuration changes.

2. The information handling system of claim 1, wherein the embedded controller further to:
   revert to a hardware configuration in the golden BIOS image of the information handling system during a runtime operation of the embedded controller.

3. The information handling system of claim 1, wherein the memory is a persistent memory of the embedded controller.

4. The information handling system of claim 1, wherein the reading of the context data includes the embedded controller further to:
   read a runtime failure context from a service operating system.

5. The information handling system of claim 1, wherein the reading of the context data includes the embedded controller further to:
   read a pre-boot failure context from the basic input/output system.

6. The information handling system of claim 5, wherein the embedded controller service is in a software stack above a bare metal state of the information handling system.

7. The information handling system of claim 5, wherein the embedded controller utilizes an embedded controller service to performing the reading of the context data.

8. An information handling system comprising:
   a memory configured to store context data associated with a crash of the information handling system;
   a basic input/output system (BIOS) configured to:
      begin a boot process of the information handling system; and
      determine whether a crash of the information handling system occurred during a most recent operating system runtime of the information handling system; and
   an embedded controller configured to communicate with the memory, the embedded controller to:
      if the crash occurred during the most recent operating system runtime, then read the context data associated with the crash of the information handling system;
      verify a golden BIOS image for the information handling system;
      set an indication for an operating system of the information handling system to revert to original setting for a healthy boot; and
      read hardware configuration changes from the golden BIOS image,
   wherein the BIOS is further configured to: during a restoration boot, disable the hardware configuration changes.

9. The information handling system of claim 8, wherein the embedded controller further to:
   revert to a hardware configuration in the golden BIOS image of the information handling system during a runtime operation of the embedded controller.

10. A method comprising:
    beginning a boot process of a basic input/output system (BIOS) of an information handling system;
    determining, by the BIOS, whether a crash of the information handling system occurred during a most recent operating system runtime of the information handling system;
    in response to the determining of the crash during the most recent operating system runtime, reading, by an embedded controller of the information handling system, context data associated with the crash of the information handling system;
    verifying a golden BIOS image for the information handling system;
    setting an indication for an operating system of the information handling system to revert to original setting for a healthy boot;
    reading hardware configuration changes from the golden BIOS image; and
    during a restoration boot, disabling the hardware configuration changes.

11. The method of claim 10, further comprising reverting to a hardware configuration in the golden BIOS image of the information handling system during a runtime operation of the embedded controller.

12. The method of claim 10, wherein the context data is stored in a persistent memory of the embedded controller.

13. The method of claim 10, wherein the reading of the context data includes:
    reading pre-boot failure context from the basic input/output system.

14. The method of claim 10, wherein the reading of the context data includes:
    reading runtime failure context from a service operating system.

15. The method of claim 10, wherein the embedded controller utilizes an embedded controller service to performing the reading of the context data.

16. The method of claim 14, wherein the embedded controller service is in a software stack above a bare metal state of the information handling system.

* * * * *